United States Patent
Chen et al.

(10) Patent No.: US 8,542,605 B2
(45) Date of Patent: Sep. 24, 2013

(54) SYSTEM AND METHOD FOR ALLOCATING RESOURCES IN AN EXTENDED BANDWIDTH WIRELESS NETWORK

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 12/904,674

(22) Filed: Oct. 14, 2010

(65) Prior Publication Data
US 2011/0090809 A1      Apr. 21, 2011

Related U.S. Application Data

(60) Provisional application No. 61/252,106, filed on Oct. 15, 2009.

(51) Int. Cl.
*H04L 12/26* (2006.01)
*H04W 72/04* (2009.01)

(52) U.S. Cl.
USPC .......................................... 370/252; 370/329

(58) Field of Classification Search
USPC .................................................. 370/252, 329
See application file for complete search history.

(56) References Cited

U.S. PATENT DOCUMENTS

| | | | |
|---|---|---|---|
| 7,136,650 B2 * | 11/2006 | Diaz Cervera et al. | 455/445 |
| 7,173,919 B1 * | 2/2007 | Dabak | 370/335 |
| 7,688,245 B2 * | 3/2010 | Mueck | 341/200 |
| 7,970,602 B2 * | 6/2011 | Toma et al. | 704/201 |
| 2007/0253466 A1 * | 11/2007 | Jones et al. | 375/131 |
| 2009/0122884 A1 * | 5/2009 | Vook et al. | 375/260 |
| 2010/0034303 A1 * | 2/2010 | Damnjanovic et al. | 375/260 |
| 2010/0254342 A1 * | 10/2010 | Cho et al. | 370/330 |

FOREIGN PATENT DOCUMENTS

| WO | 2009061257 A1 | 5/2009 |
|---|---|---|
| WO | WO2010049754 A1 | 5/2010 |

OTHER PUBLICATIONS

Huawei: "Concept for downlink carrier aggregation in LTE-Advanced" 3GPP Draft; RI-083703, 3rd Generation Partnership Project (3GPP), Mobile Competence Centre ; 650, Route Des Lucioles ; F-06921 Sophia-Antipolis Cedex ; France, no. Prague, Czech Republic; Sep. 24, 2008, XP050317045 [retrieved on Sep. 24, 2008].
International Search Report and Written Opinion—PCT/US2010/052969—International Search Authority, European Patent Office,Jan. 31, 2011.

(Continued)

*Primary Examiner* — Andrew Chriss
*Assistant Examiner* — Romani Ohri
(74) *Attorney, Agent, or Firm* — Steven A. Raney

(57) ABSTRACT

A method, an apparatus, and a computer program product for wireless communication are disclosed in which a base station provides an extended bandwidth having an extension portion and a non-extension portion. The base station can indicate for a particular user equipment (UE) to utilize only a portion of the extended bandwidth. In this way, the extended bandwidth can include multiplexed resources directed to a plurality of UEs, improving capacity and/or throughput. Moreover, backwards compatibility with devices compatible with LTE Release 8 can be achieved, as those devices can be directed to utilize only the non-extension portion of the extended bandwidth. In one aspect, the base station indicates a system bandwidth including resource blocks associated with the non-extension portion and resource blocks associated with the extension portion, and the UE is not required to monitor more than a predetermined number of resource blocks to receive a downlink transmission.

87 Claims, 12 Drawing Sheets

(56) References Cited

OTHER PUBLICATIONS

Qualcomm Europe: "Carrier Aggregation Operation in LTE-Advanced", 3GPP Draft; R1-083811, 3rd Generation Partnership Project (3GPP), Mobile Competence Centre ; 650, Route Des Lucioles ; F-06921 Sophia-Antipolis Cedex ; France, no. Prague, Czech Republic; Sep. 24, 2008, XP050317135, [retrieved on Sep. 24, 2008] paragraph [02.2].

Qualcomm Europe, "Notions of segment and backwards/non-backwards compatible carriers", 3GPP TSG RAN WG1 #57bis, R1-092704, Jul. 2009, pp. 1-2, URL, http://www.3gpp.org/ftp/tsg_ran/wg1_rl1/TSGR1_57b/Docs/R1-092704.zip.

\* cited by examiner

Downlink Radio Frame

Uplink Radio Frame

SYSTEM AND METHOD FOR ALLOCATING RESOURCES IN AN EXTENDED BANDWIDTH WIRELESS NETWORK

CROSS-REFERENCE TO RELATED APPLICATION(S)

This application claims the benefit of U.S. Provisional Application Ser. No. 61/252,106, entitled "SYSTEM BANDWIDTH INTERPRETATION FOR CARRIER EXTENSION IN LTE-A" and filed on Oct. 15, 2009, which is expressly incorporated by reference herein in its entirety.

BACKGROUND

1. Field

The present disclosure relates generally to communication systems, and more particularly, to a system and method for allocating resources to user equipment.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A method, an apparatus, and a computer program product for wireless communication are disclosed in which a base station provides an extended bandwidth having an extension portion and a non-extension portion. The base station can indicate for a particular user equipment (UE) to utilize only a portion of the extended bandwidth. In this way, the extended bandwidth can include multiplexed resources directed to a plurality of UEs, improving capacity and/or throughput. Moreover, backwards compatibility with devices compatible with LTE Release 8 can be achieved, as those devices can be directed to utilize only the non-extension portion of the extended bandwidth. In one aspect, the base station indicates a system bandwidth that includes resource blocks associated with the non-extension portion and resource blocks associated with the extension portion, and the UE is not required to monitor more than a predetermined number of resource blocks to receive a downlink transmission.

In an aspect of the disclosure, a method of wireless communication includes receiving from a base station an indication of a first system bandwidth. Here, the first system bandwidth includes a subset of resource blocks associated with a second system bandwidth configured by the base station, and the second system bandwidth has a non-extension portion and an extension portion. Further, the method includes communicating with the base station based on the first system bandwidth.

In another aspect of the disclosure, a method of wireless communication includes determining a first system bandwidth that includes a subset of resource blocks associated with a second system bandwidth, where the second system bandwidth has an extension portion and a non-extension portion. The method further includes transmitting an indication of the first system bandwidth and communicating with a user equipment based on the first system bandwidth.

In another aspect of the disclosure, an apparatus for wireless communication includes means for receiving from a base station an indication of a first system bandwidth, the first system bandwidth comprising a subset of resource blocks associated with a second system bandwidth configured by the base station, where the second system bandwidth includes a non-extension portion and an extension portion, and means for communicating with the base station based on the first system bandwidth.

In yet another aspect of the disclosure, an apparatus for wireless communication includes means for determining a first system bandwidth comprising a subset of resource blocks associated with a second system bandwidth, where the second system bandwidth includes an extension portion and a non-extension portion, means for transmitting an indication of the first system bandwidth, and means for communicating with a user equipment based on the first system bandwidth.

In yet another aspect of the disclosure, a computer program product includes a computer-readable medium having instructions for causing a computer to receive from a base station an indication of a first system bandwidth, the first system bandwidth comprising a subset of resource blocks associated with a second system bandwidth configured by the base station, the second system bandwidth including a non-extension portion and an extension portion, and instructions for causing a computer to communicate with the base station based on the first system bandwidth.

In another aspect of the disclosure, a computer program product includes a computer-readable medium having instructions for causing a computer to determine a first system bandwidth comprising a subset of resource blocks associated with a second system bandwidth, the second system bandwidth including an extension portion and a non-extension portion, instructions for causing a computer to transmit an indication of the first system bandwidth, and instructions for causing a computer to communicate with a user equipment based on the first system bandwidth.

In yet another aspect of the disclosure, an apparatus for wireless communication includes a processing system and a memory coupled to the processing system, wherein the processing system is configured to receive from a base station an indication of a first system bandwidth, the first system bandwidth comprising a subset of resource blocks associated with a second system bandwidth configured by the base station, the second system bandwidth including a non-extension portion and an extension portion, and communicate with the base station based on the first system bandwidth.

In another aspect of the disclosure, an apparatus for wireless communication includes a processing system and a memory coupled to the processing system, wherein the processing system is configured to determine a first system bandwidth comprising a subset of resource blocks associated with a second system bandwidth, the second system bandwidth including an extension portion and a non-extension portion, transmit an indication of the first system bandwidth, and communicate with a user equipment based on the first system bandwidth.

DETAILED DESCRIPTION

Figure 1:
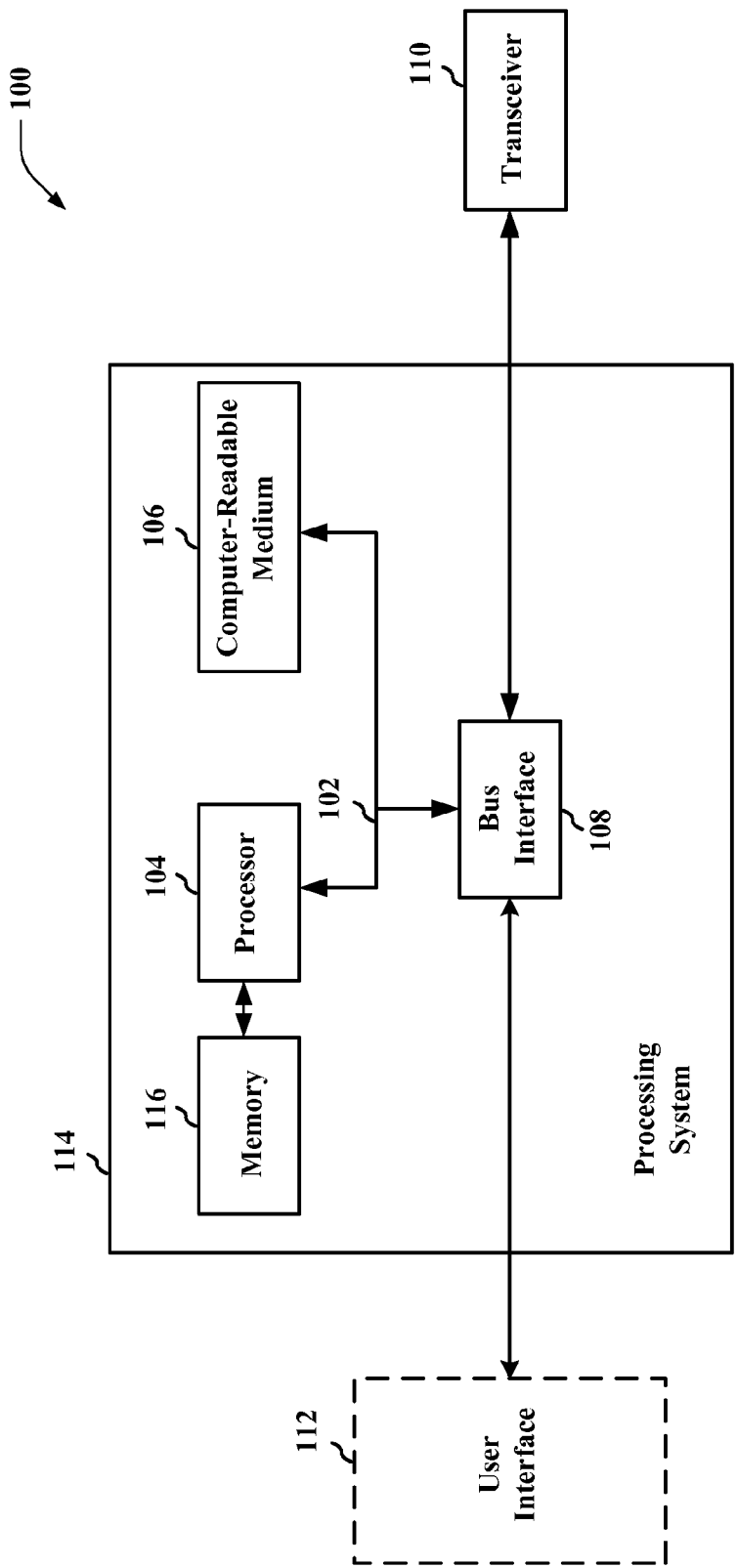
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a transmission line, or any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a block diagram of an exemplary hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, memory 116, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, etc.) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
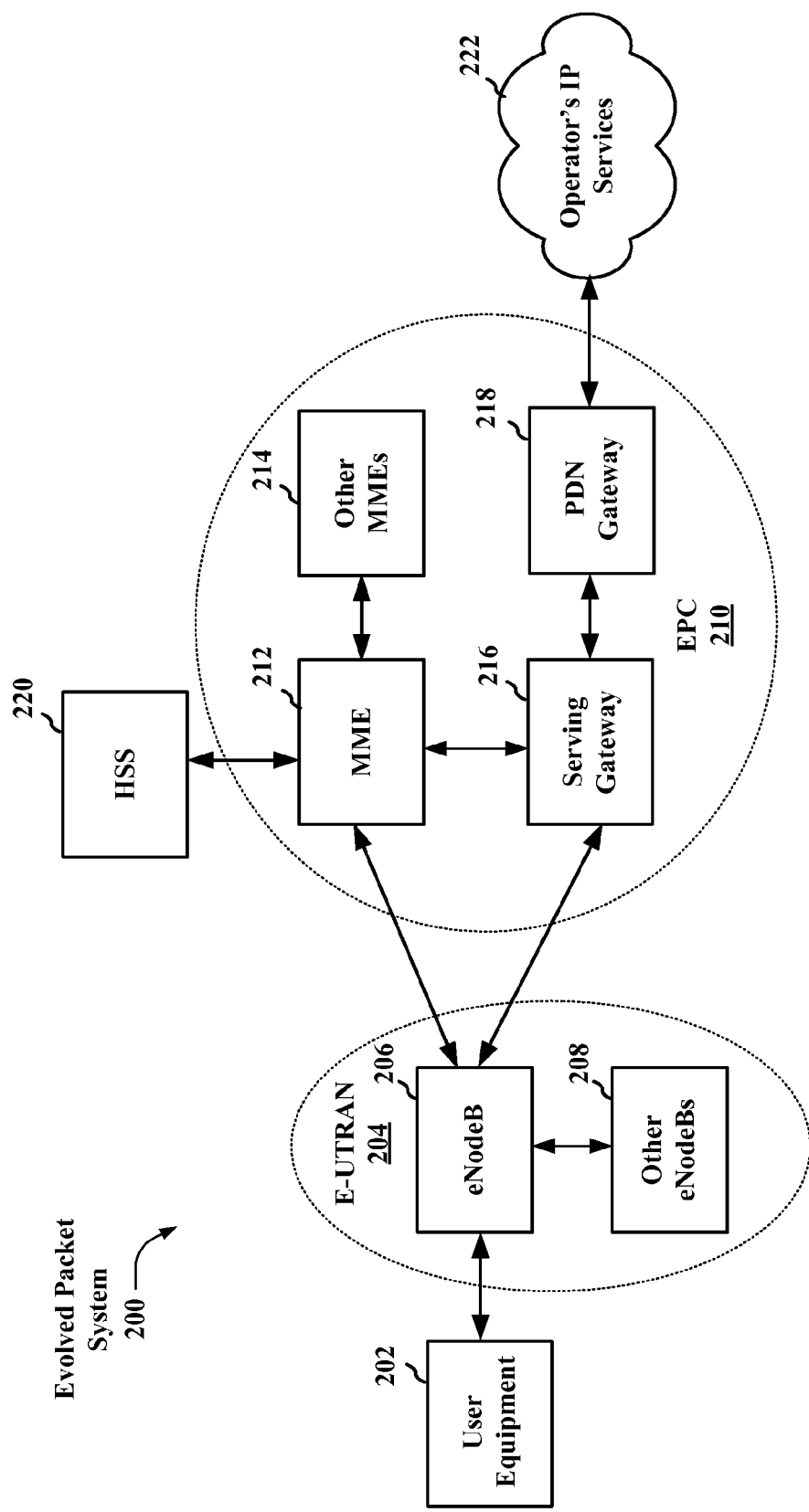
FIG. 2 is a diagram illustrating an example of a network architecture.

FIG. 2 is a diagram illustrating an LTE network architecture 200. The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services. The various elements of EPS 200 may include apparatuses 100 (FIG. 1).

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
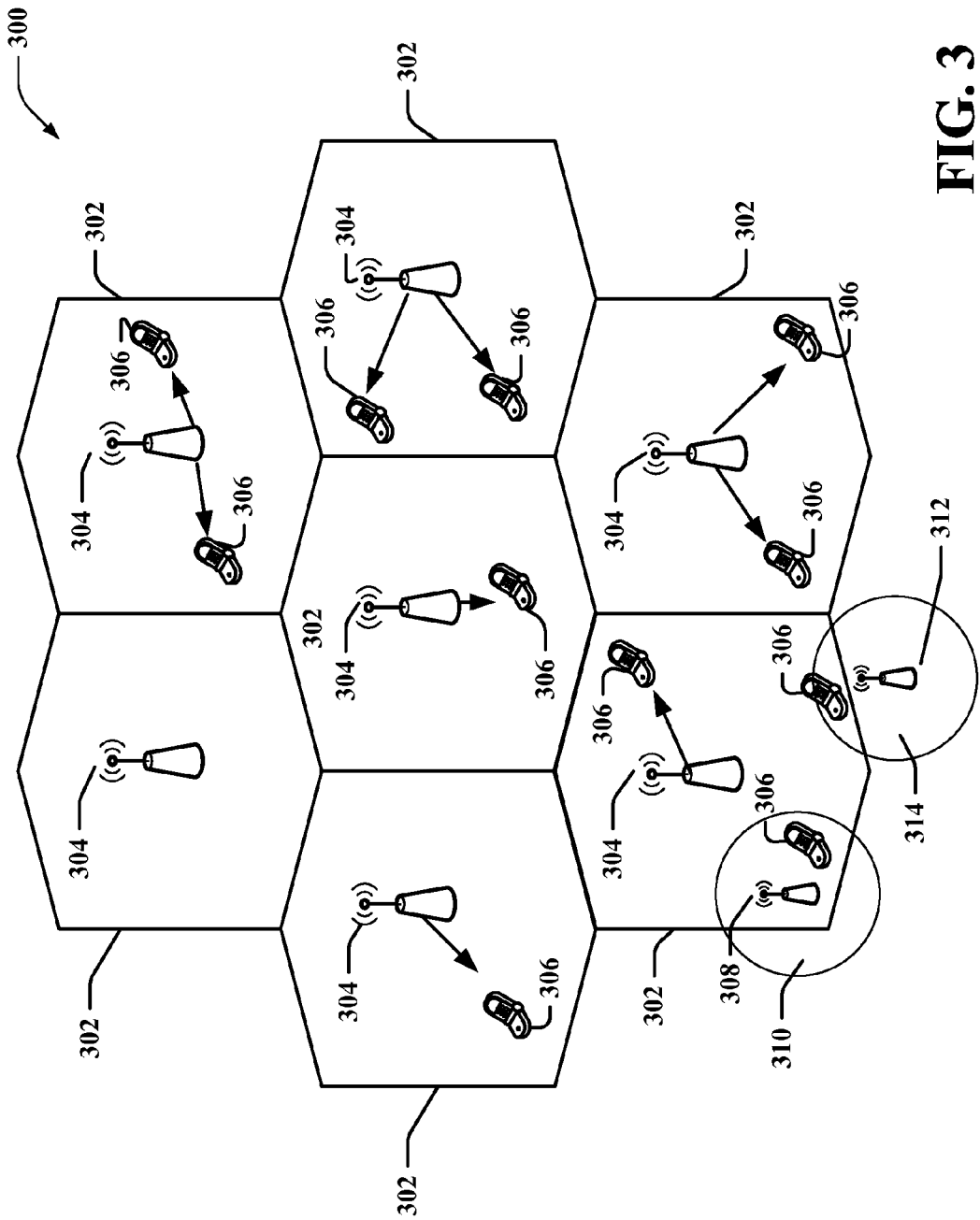
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio.

Various frame structures may be used to support the DL and UL transmissions. An example of a structure of a frequency division duplex (FDD) DL radio frame 414 in a conventional LTE design (e.g., one following the 3GPP release 8 standard) will now be presented with reference to FIG. 4. However, as those skilled in the art will readily appreciate, the structure of the radio frame 414 for any particular application may be different depending on any number of factors, including the release of 3GPP standards for LTE systems beyond release 8. In general, the smallest addressable unit, called a resource block 408, includes twelve consecutive subcarriers 416 in frequency, and seven consecutive OFDM 418 symbols in time. The resource block 408 is thus generally 180 kHz in the frequency domain and 0.5-ms (or one slot 410) in the time domain.

A subframe 412 is also the minimum transmission time interval (TTI). Depending on the channel bandwidth, each slot may include one of six different numbers of resource blocks 408 (i.e., 6, 15, 25, 50, 75, or 100 resource blocks 408). Six of the resource blocks 408 (frequently the six RBs in the middle of the system bandwidth) are generally configured to include information such as synchronization signals (PSS and SSS) and a physical broadcast channel (PBCH).

In the illustrated example, a 10-ms radio frame 414 is divided into ten 1-ms subframes 412, each subframe 412 including a plurality of resource blocks 408. Here, each subframe is further divided in time into two 0.5-ms time slots 410, and each time slot 410 includes a number of OFDM symbols. This number may typically be 6 or 7 OFDM symbols, corresponding to the usage of an extended Cyclic Prefix or a normal Cyclic Prefix. Each resource block 408 further is divided in the frequency domain into a number of subcarriers 416, which may be spaced at 7.5 kHz or 15 kHz in different configurations. The total number of subcarriers depends on the channel bandwidth. Further, to reduce or avoid interference with adjacent bands, there may be a guard band of up to about 1 MHz at each edge of the OFDMA signal where no RF transmission is typically provided.

A resource grid 450 may be used to represent resource blocks 408 in a subframe 412. Here, the resource grid 450 is divided into multiple resource elements 406. In LTE, according to one example, a resource block 408 may contain 12 consecutive subcarriers 416 in the frequency domain and, for a normal cyclic prefix in each OFDM symbol, seven consecutive OFDM symbols 418 in the time domain, or 84 resource elements 406. That is, a resource element 406 is essentially one subcarrier and one OFDM symbol. A modulation symbol, which represents the number of data bits, is mapped to one resource element 406. The number of bits carried by each resource element 406 depends on the modulation scheme. Thus, the more resource blocks 408 that a UE receives and the higher the modulation scheme, the higher the data rate for the UE.

Figure 4:
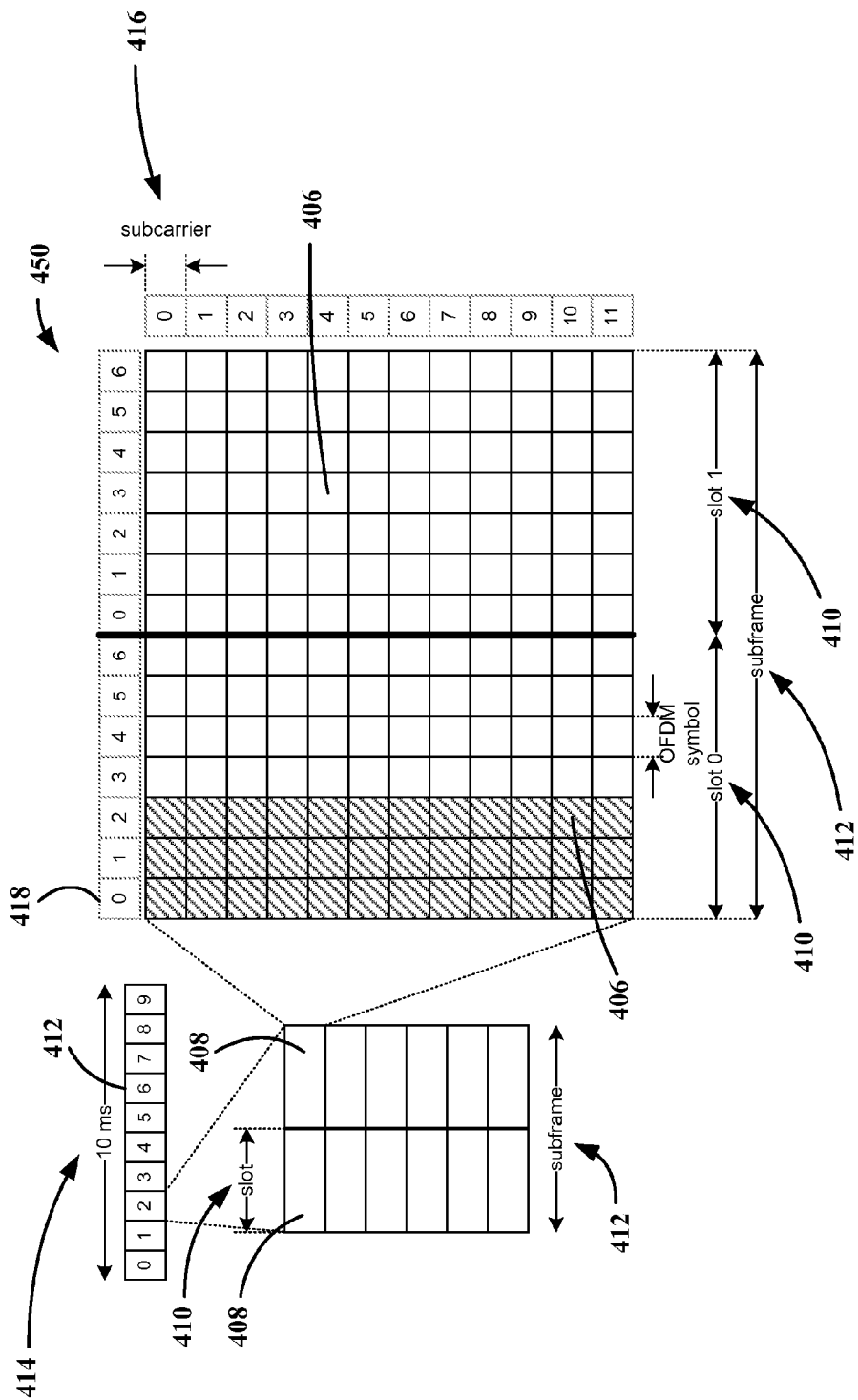
FIG. 4 is a diagram illustrating an example of a downlink frame structure for use in an access network.
Figure 5:
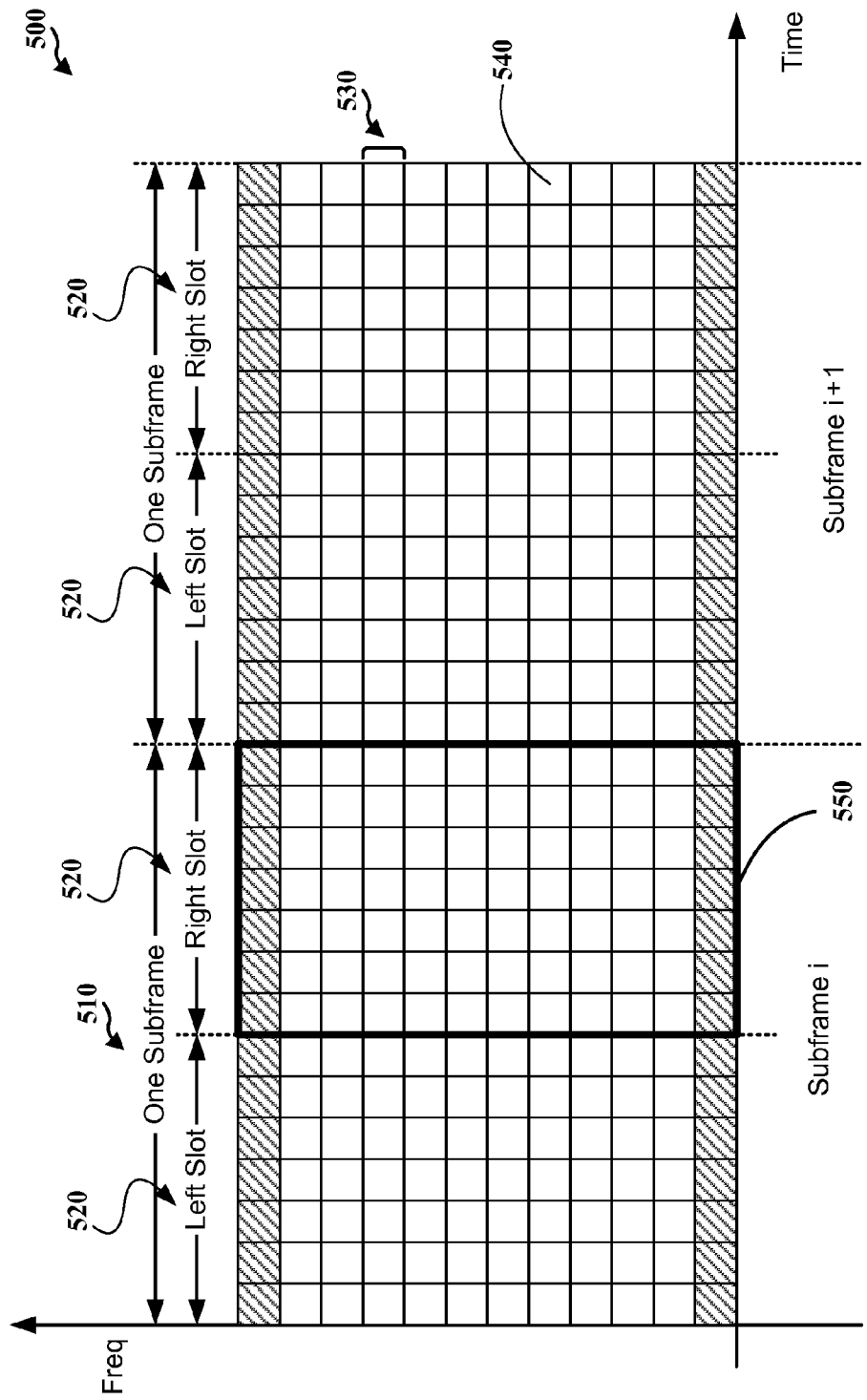
FIG. 5 is a diagram illustrating an example of an uplink subframe structure.

An example of an FDD UL radio frame structure 500 will now be presented with reference to FIG. 5. Similar to the DL radio frame structure illustrated in FIG. 4, the UL radio frame 500 may include two subframes 510 each including two slots 520. Further, the radio frame 500 may be divided in frequency into a number of subcarriers 530, such that resource elements 540 include one OFDM symbol and one subcarrier. Resource blocks 550 are blocks of resource elements 540 in one slot 520. Moreover, similar to the DL radio frame, six resource blocks 550 among the resource blocks utilized in the uplink carrier are generally allocated for information such as a physical random access channel (PRACH), etc.

In the above described examples illustrated in FIGS. 4 and 5, each slot may be configured to include certain numbers of resource blocks (i.e., 6, 15, 25, 50, 75, or 100 resource blocks, corresponding to, e.g., approximately 1.4, 3, 5, 10, 15, or 20 MHz bandwidths). Thus, when an eNB is deployed, it typically adopts one of these system bandwidths and transmits signals accordingly. However, as the 3GPP standards continue to evolve, other numbers of resource blocks, including any number of resource blocks from 6 up to 110, or even more than 110 resource blocks may be allocated to a particular carrier. For example, the guard bands, described above, at the edges of the carrier may include additional resource blocks.

An issue with the utilization of numbers of resource blocks other than the certain numbers described above is that the transmissions are no longer backwards-compatible. That is, if an eNB configured in accordance with a newer standard (e.g., in accordance with 3GPP release 9 or later, herein referred to as "New") signals a value other than the six possible system bandwidths described above, a UE configured in accordance with an earlier standard (e.g., in accordance with 3GPP release 8, hereafter referred to as "R8") may not be able to handle the request or decode all of the data. However, to increase throughput it may be desired to utilize the increased available system bandwidth in New eNB deployments.

Figure 6:
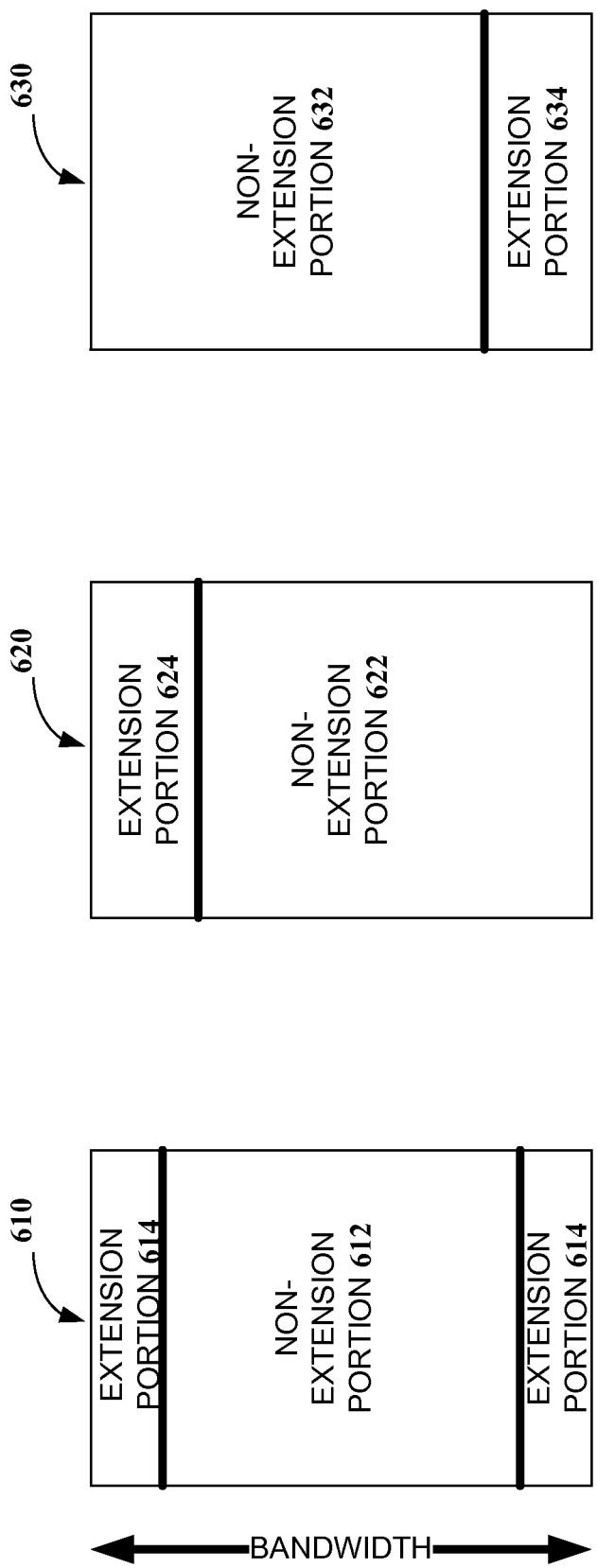
FIG. 6 is a diagram illustrating a frame having an extended bandwidth.

FIG. 6 illustrates examples of subframes having a bandwidth extension wherein an extended bandwidth, i.e., an additional number of resource blocks, is utilized for transmission on either the uplink or downlink. In the first extended bandwidth 610, a non-extension portion 612 includes one of the above-described, conventionally specified number of resource blocks, and is therefore recognized by a legacy R8 UE. The first extended bandwidth 610 further includes extension portions 614 that are symmetrically distributed at the respective edges of the non-extension portion 612, such that the non-extension portion 612 is centered between the extension portions 614.

An R8 UE receiving this bandwidth would not look to these extension portions 614, as they would fall within what the R8 UE would consider to be the guard band. However, a New UE may be capable of recognizing and decoding the resource blocks within the extension portions 614, thus increasing the throughput for the New UE, in addition to providing a differentiated level of service unavailable to R8 UEs. Bandwidths 620 and 630 respectively illustrate other examples to show that the extension portions 624 and 634 need not symmetrically surround the non-extension portion 622 and 632, but may be on either side of the non-extension portion. Of course, other configurations may be utilized within the scope of this disclosure.

In this way, an R8 UE may be signaled to utilize the resource blocks within the non-extension portion, and the New UE may be signaled of the availability of the resource blocks in the extension portion. In this way, the extension portions of the system bandwidth are only available to the New UEs, and an eNB can maintain backward compatibility with R8 UEs while providing improved and/or differentiated service to New UEs.

Figure 7:
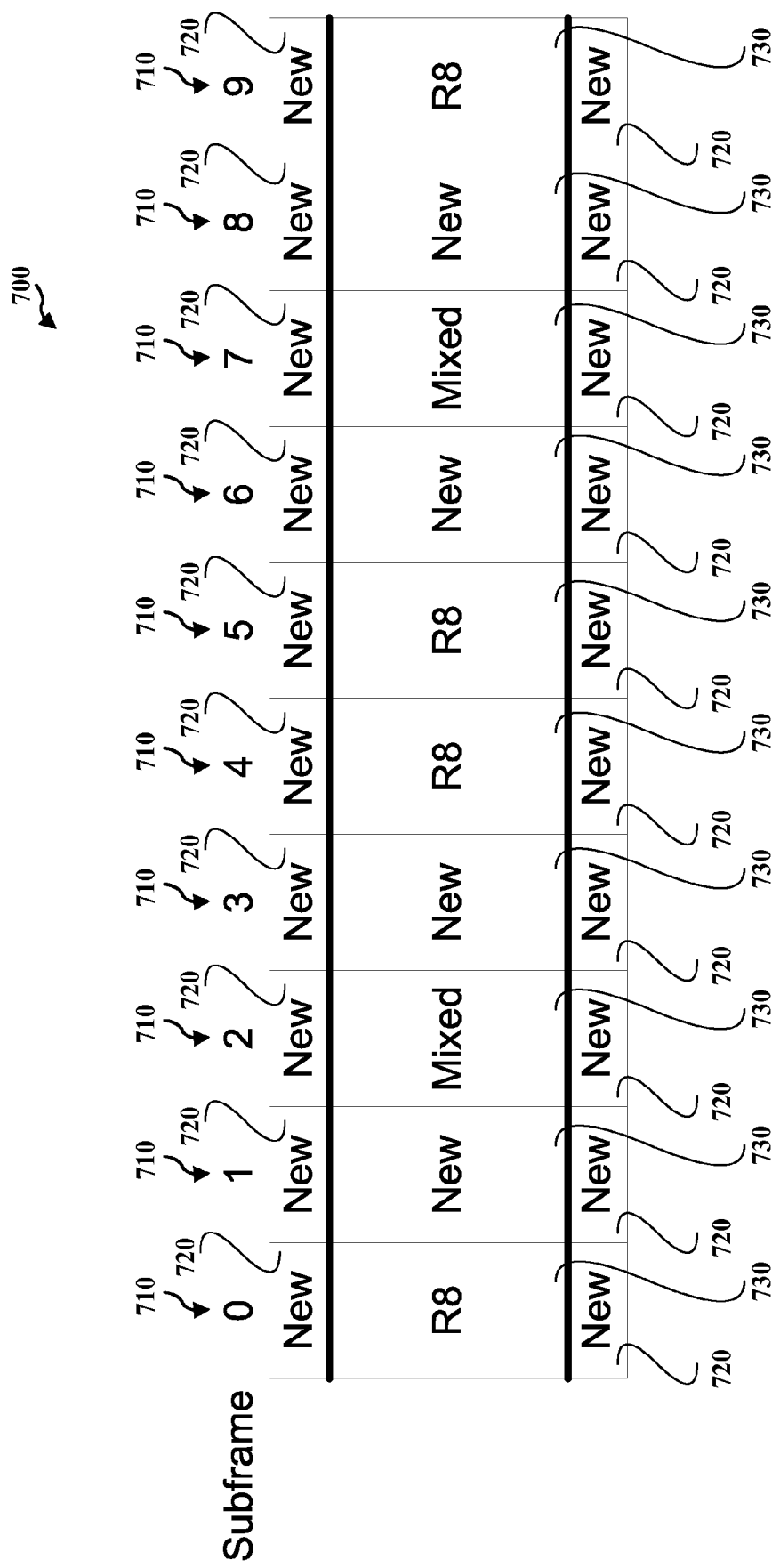
FIG. 7 is a diagram illustrating extended bandwidth frames that maintain backward compatibility.

FIG. 7 illustrates a radio frame 700 which may be applicable for either an uplink or downlink transmission. In some examples, the illustrated radio frame 700 may be provided on one of a plurality of carriers. Here, the radio frame 700 includes ten subframes 710, each subframe 710 having a bandwidth including an extension portion 720 and a non-extension portion 730 to enable multiplexing for R8 UEs configured in accordance with 3GPP Release 8 specifications, and New UEs configured in accordance with 3GPP Release 9 or later specifications. Here, the radio frame 700 takes the symmetric configuration of the bandwidth 610 illustrated in FIG. 6, however, other configurations are possible within the scope of this disclosure. Returning to FIG. 7, the illustrated bandwidth may be considered to provide the extension portions 720 at the respective edges of the non-extension portion 730, e.g., within the guard band for R8 UEs. Here, the non-extension portions 730 of subframes 0, 4, 5, and 9 are configured to include data addressed to R8 UEs only; the non-extension portions 730 of subframes 1, 3, 6, and 8 are configured to include data addressed to New UEs only; and the non-extension portions 730 of subframes 2 and 7 are configured to include data addressed to a mix of R8 and New UEs.

Of course, data in each of the extension portions 720 includes data exclusively addressed to New UEs, as these extension portions 720 are not accessible by R8 UEs, as described above. The particular layout of these subframes is only given here as an illustrative example; other sequences of data in the non-extension portions 730 may be utilized, or alternatively, all the non-extension portions may be reserved for R8 data or they may all be mixed R8 and New data. In any case, the above-described radio frame 700 provides for multiplexing of data directed for R8 and New UEs, while providing for improved throughput for New UEs by way of the extension portions 720.

In the radio frame 700, for resources dedicated to New UEs only (i.e., the extension portions 720 in subframes 0, 2, 4, 5, 7, and 9, and the entire bandwidth in subframes 1, 3, 6, and 8), a R8-type control channel structure is not needed. Indeed, for the extension portions 720, it may be desired not to transmit any control information at all, reserving these portions for data transmissions to New UEs. That is, in an exemplary aspect of the disclosure, scheduling for New UEs may rely on R8 control channels in the non-extension portion 730 of a radio frame.

Referring back to FIG. 4, in release 8 LTE specifications, within each downlink subframe 412, downlink control signaling may be located in a control region including the first n OFDM symbols 418 of each subcarrier, where n≦3 for large system bandwidths (e.g., those with >10 resource blocks), and n≦4 otherwise. That is, the downlink control signaling (indicated by the shaded resource elements) may be located in OFDM symbols 0, 1, and 2 within the slot 410 labeled slot 0. The remaining OFDM symbols in the subframe (i.e., OFDM symbols 3-6 in slot 0 and OFDM symbols 0-6 in slot 1) are then available as a data region.

Figure 8:
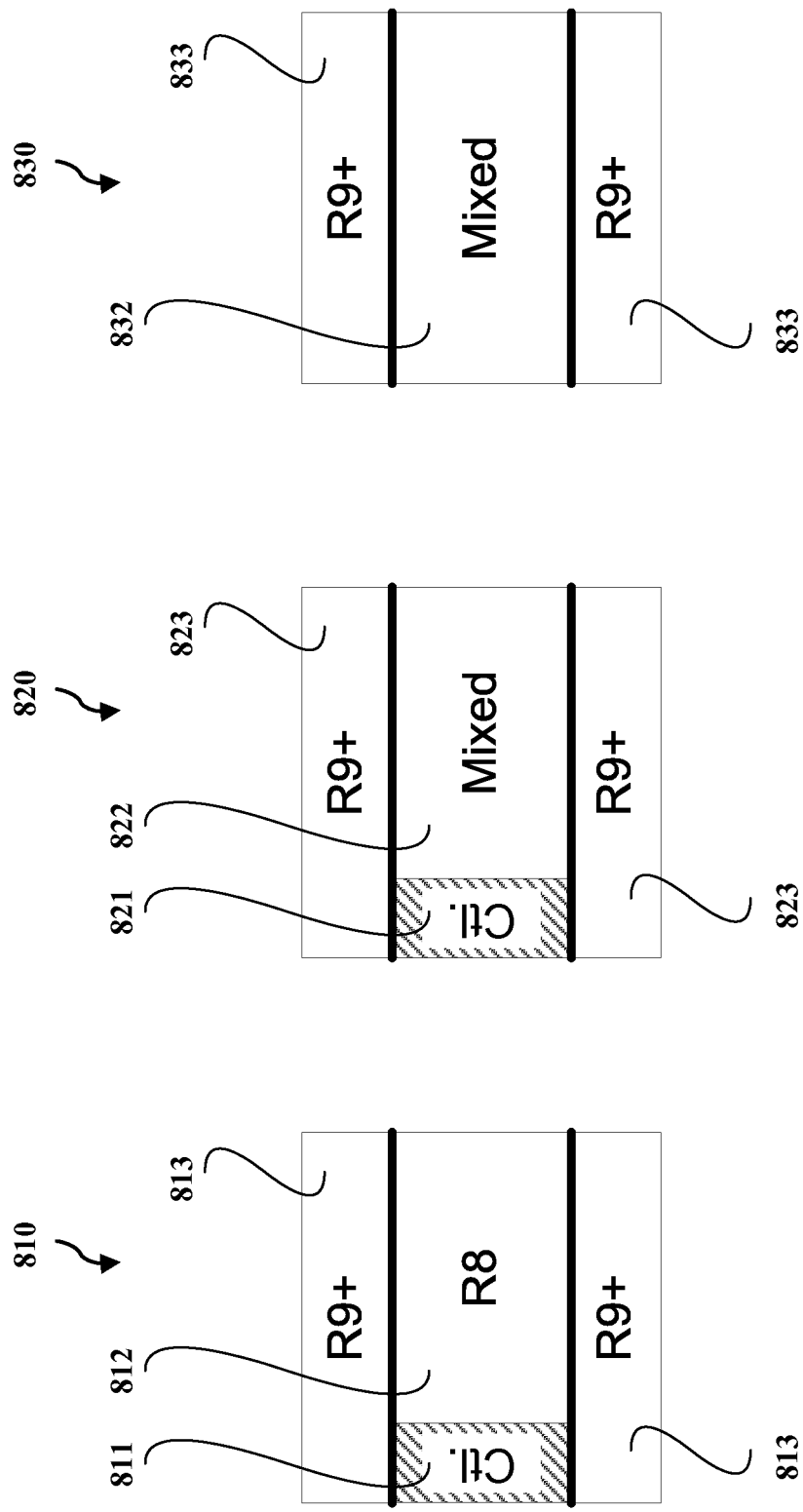
FIG. 8 is a diagram illustrating the control region structure of frames having extended bandwidth.

FIG. 8 illustrates several backwards-compatible downlink subframes showing some examples of a control channel structure in accordance with various aspects of the disclosure. In subframe 810, a non-extension portion includes a control channel portion 811 and a data portion 812. The data portion 812 in this example is limited to information directed to R8 UEs. Subframe 820 includes an extension portion 823 and a non-extension portion including a control channel portion 821 and a data portion 822. Here, the data portion 822 includes a mix of information directed to R8 UEs and information directed to New UEs. Subframe 830 includes an extension portion 833 and a non-extension portion 832 that lacks a control portion, such that all of the OFDM symbols are dedicated to a data portion for a mix of R8 and New data. In each of these subframes 810, 820, and 830, the respective extension portions 813, 823, and 833 include New data without any R8 control portion.

When utilizing an extended bandwidth as discussed above, it may be desirable for an eNB to provide greater than 110 resource blocks on a downlink transmission. However, although an R8 UE is generally limited to receiving 100 resource blocks, in accordance with the 3GPP standards, its transport block size is listed assuming that no more than 110 resource blocks will be transmitted on a carrier. Thus, if a downlink from an eNB is provided including greater than 110 resource blocks, the transport block table may require a redesign, which is generally not desired.

Thus, in an aspect of the disclosure, an eNB may provide greater than 110 resource blocks on a downlink transmission while maintaining backwards compatibility with R8 UEs. Here, this is enabled by configuring each New UE to monitor less than all resource blocks included on the downlink carrier. For example, although a particular eNB may provide 120 resource blocks on a downlink carrier, each New UE monitors only a subset of these resource blocks, i.e., 110 resource blocks. Of course, an R8 UE monitors 100 of the resource blocks, i.e., those in the non-extension portion, as this is generally its upper limitation according to R8 standards.

Thus, according to an aspect of the disclosure, a UE, whether it is an R8 UE or a New UE, monitors only a subset of the system bandwidth provided on a downlink carrier. That is, each UE may only see a portion of the bandwidth provided on the downlink carrier. Furthermore, different UEs may see different parts of the bandwidth provided on the downlink carrier. That is, a subset of New UEs within a cell may see a first portion of the bandwidth, while another subset of the New UEs within the cell may see a second portion of the bandwidth, different from the first portion. Moreover, the size of the respective portions of the bandwidth seen by different subsets of the New UEs within the cell may be the same size (e.g., the same number of resource blocks) or different sizes (e.g., different numbers of resource blocks).

Figure 9:
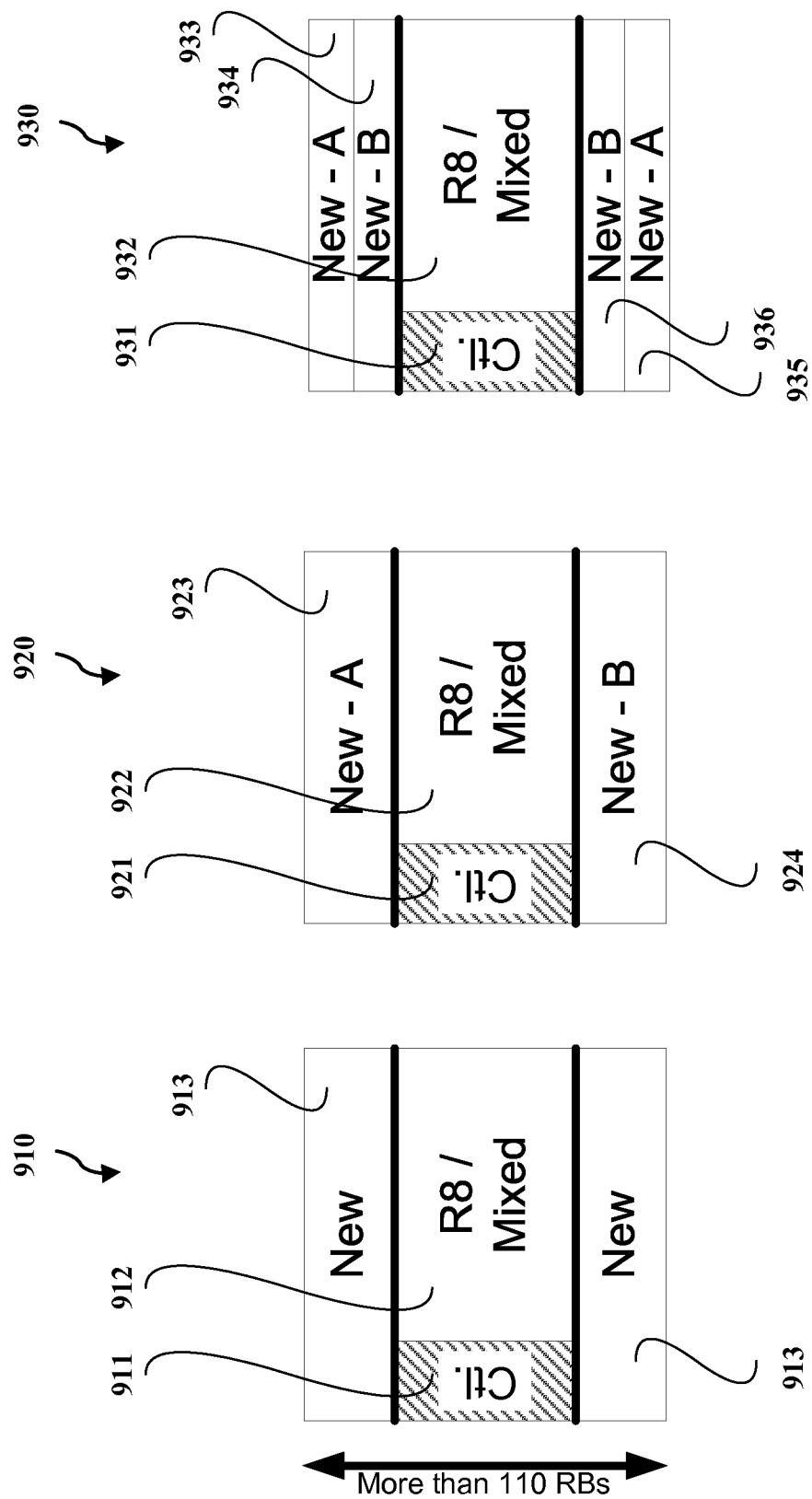
FIG. 9 is a diagram illustrating the multiplexing of resources amongst user equipment in the extension portion of an extended bandwidth frame.

FIG. 9 is a diagram illustrating three examples of downlink frames 910, 920, and 930 that each provide a non-extension portion that carries 100 resource blocks, and an extension portion that carries more than 10 resource blocks. Thus, the bandwidth as a whole carries greater than 110 resource blocks in this example. In each of the illustrated frames, the extension portions are distributed symmetrically about the non-extension portion, but as described above, other configurations are possible within the scope of this disclosure.

The first frame 910 includes a non-extension portion having a data region 912 and a control region 911, and an extension portion 913. The extension portion 913 is exclusive of R8 resource elements, and is limited to carrying New LTE resource elements. However, the data region 912 can carry R8 resource elements, New resource elements, or a mix of R8 and New resource elements. Here, because the extension portion 913 carries greater than 10 resource blocks, the total system bandwidth available to a New UE is greater than 110 resource blocks. However, as discussed above, because common signaling may be utilized for legacy R8 UEs and for New UEs to indicate the number of available resource blocks, it may be desired to instead limit the number of resource blocks that are indicated as being available to 110. Thus, for example, the second and third frames 920 and 930 subdivide and allocate their respective extension portions amongst a plurality of New UEs, as discussed below.

The second frame 920 includes a non-extension portion including a data region 922 and a control region 921, and first and second extension portions 923 and 924. Each of the respective extension portions 923 and 924 may be exclusive of R8 resource elements, and limited to carrying New resource elements. However, the data region 922 may carry R8 resource elements, New resource elements, or a mix of R8 and New resource elements. Here, the extension portions 923 and 924, when considered individually or together, may include greater than 10 resource blocks such that the total system bandwidth is greater than 110 resource blocks. However, in the second frame 920, the first extension portion 923 is allocated to a first subset of the New UEs in the cell, and the second extension portion 924 is allocated to a second subset of the New UEs in the cell. For example, the first extension portion 923 may include 10 resource blocks allocated to subset A, which may include one or more New UEs in the cell.

In a case where the non-extension portion includes 100 resource blocks, including a mix of R8 and New resource blocks, or in a case where the non-extension portion includes only New resource blocks, subset A can receive information included in the non-extension portion and the first extension portion 923 to provide up to 110 resource blocks to a New UE in the first subset A. Similarly, a New UE in the second subset B can receive information included in the non-extension portion and the second extension portion 924 to provide up to 110 resource blocks to the New UE in the second subset B. Further, in this example, an R8 UE may receive up to 100 resource blocks in the non-extension portion. Of course, the designation of which of the extension portions is allocated to which of the subsets of UEs may change over time. Furthermore, in the described example, each of the extension portions is described as being of equal size; however, in other examples, the first extension portion 923 may be larger or smaller than the second extension portion 924, such that the subsets A and B may receive different numbers of resource blocks from the same radio frame.

As illustrated by the second frame 920, the effective bandwidth for the subsets A and B may be asymmetrical. That is, because a New UE in one of the subsets is only monitoring one of the extension portions on one edge of the non-extension portion, the six resource blocks configured to include synchronization signals and a physical broadcast channel, which are typically included at the center of the bandwidth of the non-extension portion, are not at the center of the effective bandwidth. While a New UE may be configured to obtain the information in those resource blocks even though they are not in the center of the effective bandwidth, for various reasons it may be desired to configure the frame such that those resource blocks are in the center so that the effective bandwidth is symmetrical.

Accordingly, the third frame 930 includes a non-extension portion including a data region 932 and a control region 931, and extension portions 933, 934, 935, and 936, configured so that the effective bandwidth is symmetrical. That is, as in frame 920, in frame 930, the respective extension portions are subdivided and allocated to a first subset A of New UEs and a second subset B of New UEs. However, here, the extension portion at the upper part of the non-extension portion is further subdivided between the two subsets A and B, and the extension portion at the lower part of the non-extension portion is subdivided between the two subsets A and B. Here, extension portions 934 and 936 are allocated to subset B, and located at the proximate edges of the non-extension portion; and extension portions 933 and 935 are allocated to subset A, and located at the outer edges of the bandwidth of the frame 930.

In this way, a New UE in subset A may be configured to receive information in a symmetrical bandwidth including the non-extension portion and the extension portions 933 and 935 at outer edges of the frame 930. Similarly, a New UE in subset B may be configured to receive information in a symmetrical bandwidth including the non-extension portion and the extension portions 934 and 936 at the proximate edges of the non-extension portion. The number of resource blocks allocated to subset A may be the same or different from the number of resource blocks allocated to subset B. Moreover, although such a change may affect the symmetry of the effective bandwidth, the number of resource blocks allocated to subset A at the top of the bandwidth in extension portion 933 may be different from the number of resource blocks allocated to subset A at the bottom of the bandwidth in extension portion 935.

According to a further aspect of the disclosure, a New UE may be notified of which part or parts of the bandwidth it is to monitor and receive its respective resource blocks. For example, the UE may receive explicit signaling identifying a subset of the resource blocks in the extension portion that it should monitor, e.g., by utilizing layer 3 (RRC) signaling. In another example, one or more UEs may receive a broadcast message identifying the subset of the resource blocks they should monitor. Here, the broadcast message may be a point-to-multipoint transmission commonly received by a plurality of receivers.

In yet another example, instead of receiving an instruction to monitor a particular subset of the resource blocks, a UE may be specified to only monitor a particular portion of the potentially available bandwidth. Here, various UEs may be allocated to various subsets of the potentially available system bandwidth in accordance with a parameter, for example, a characteristic of a UE-specific radio network temporary identifier (RNTI). For example, in an aspect of the disclosure, a first UE with an even-numbered RNTI may monitor a first subset of the resource blocks in the extension portion, while a second UE with an odd-numbered RNTI may monitor a second subset of the resource blocks in the extension portion. Of course, the even/odd distinction is only one example, and other procedures may be utilized to distribute the resource blocks within the extension portion amongst a number of UEs, with any number of subsets of UEs being utilized.

Of course, while the above-described aspects of the disclosure have considered cases where the system bandwidth is greater than 110 resource blocks, those skilled in the art will comprehend that the same concepts may be applied to a system bandwidth of essentially any size, including a size less than 110 resource blocks. For example, if there is a desire for different subsets of UEs to receive information to utilize different portions of the system bandwidth, the system bandwidth may be allocated as described above.

Allocating the system bandwidth to particular subsets of users as described above in various aspects of the disclosure can provide an additional way for a service provider to provide differentiated services to different subsets of users, for example, having premium services only available to certain groups of users who may pay for such premium services. More broadly, aspects of the disclosure provide for multiplexing of system resources among a plurality of subsets of UEs, enabling an improved distribution of system resources among the UEs depending on factors such as system loading. Further, when a UE only monitors a portion of the radio frame, e.g., no more than 110 resource blocks, it can reduce the energy used by a particular UE, in that it may not required to monitor the entire system bandwidth, e.g., greater than 110 resource blocks.

Figure 10:
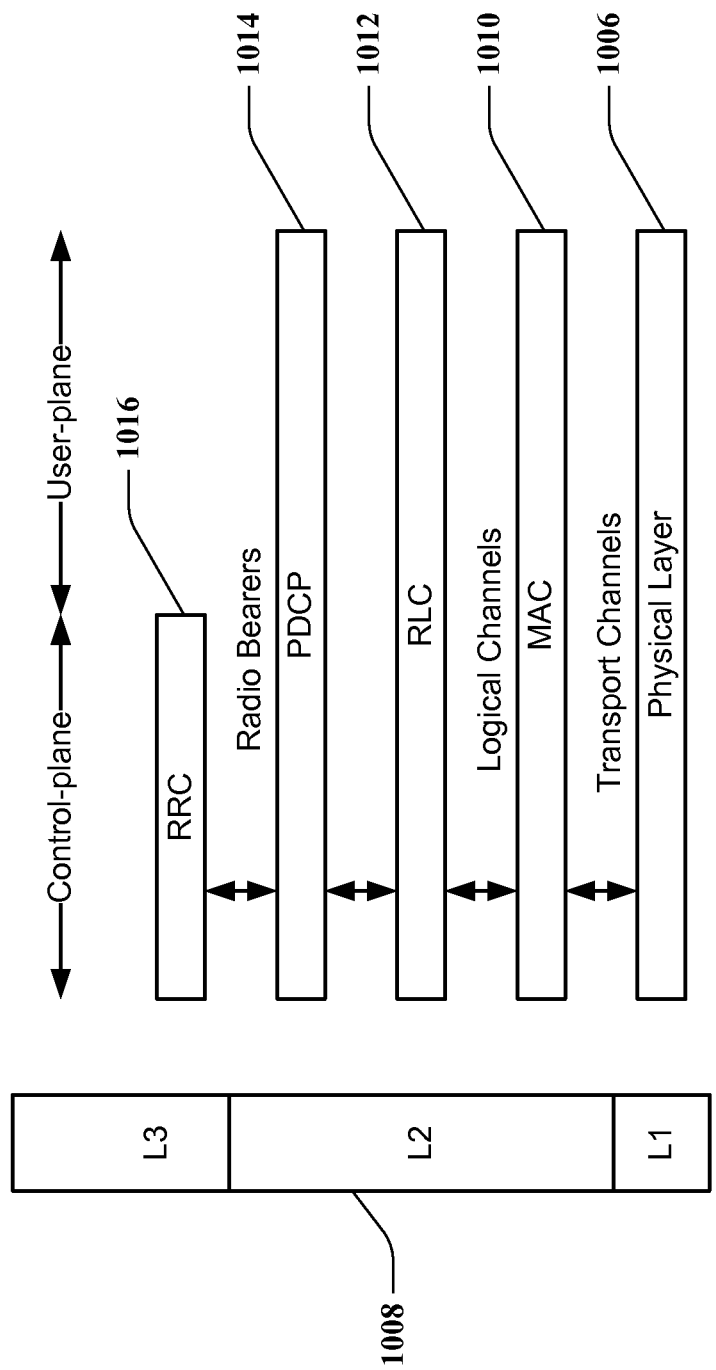
FIG. 10 is a diagram illustrating an example of a radio protocol architecture for the user and control plane.

The radio protocol architecture may take on various forms depending on the particular application. An example for an LTE system will now be presented with reference to FIG. 10. FIG. 10 is a diagram illustrating an example of the radio protocol architecture for the user and control planes.

Turning to FIG. 10, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 1006. Layer 2 (L2 layer) 1008 is above the physical layer 1006 and is responsible for the link between the UE and eNB over the physical layer 1006.

In the user plane, the L2 layer 1008 includes a media access control (MAC) sublayer 1010, a radio link control (RLC) sublayer 1012, and a packet data convergence protocol (PDCP) 1014 sublayer, which are terminated at the eNB on the network side. Although not shown, the UE may have several upper layers above the L2 layer 1008 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 1014 provides multiplexing between different radio bearers and logical channels. The PDCP sublayer 1014 also provides header compression for upper layer data packets to reduce radio transmission overhead, security by ciphering the data packets, and handover support for UEs between eNBs. The RLC sublayer 1012 provides segmentation and reassembly of upper layer data packets, retransmission of lost data packets, and reordering of data packets to compensate for out-of-order reception due to hybrid automatic repeat request (HARQ). The MAC sublayer 1010 provides multiplexing between logical and transport channels. The MAC sublayer 1010 is also responsible for allocating the various radio resources (e.g., resource blocks) in one cell among the UEs. The MAC sublayer 1010 is also responsible for HARQ operations.

In the control plane, the radio protocol architecture for the UE and eNB is substantially the same for the physical layer 1006 and the L2 layer 1008 with the exception that there is no header compression function for the control plane. The control plane also includes a radio resource control (RRC) sublayer 1016 in Layer 3. The RRC sublayer 1016 is responsible for obtaining radio resources (i.e., radio bearers) and for configuring the lower layers using RRC signaling between the eNB and the UE.

Figure 11:
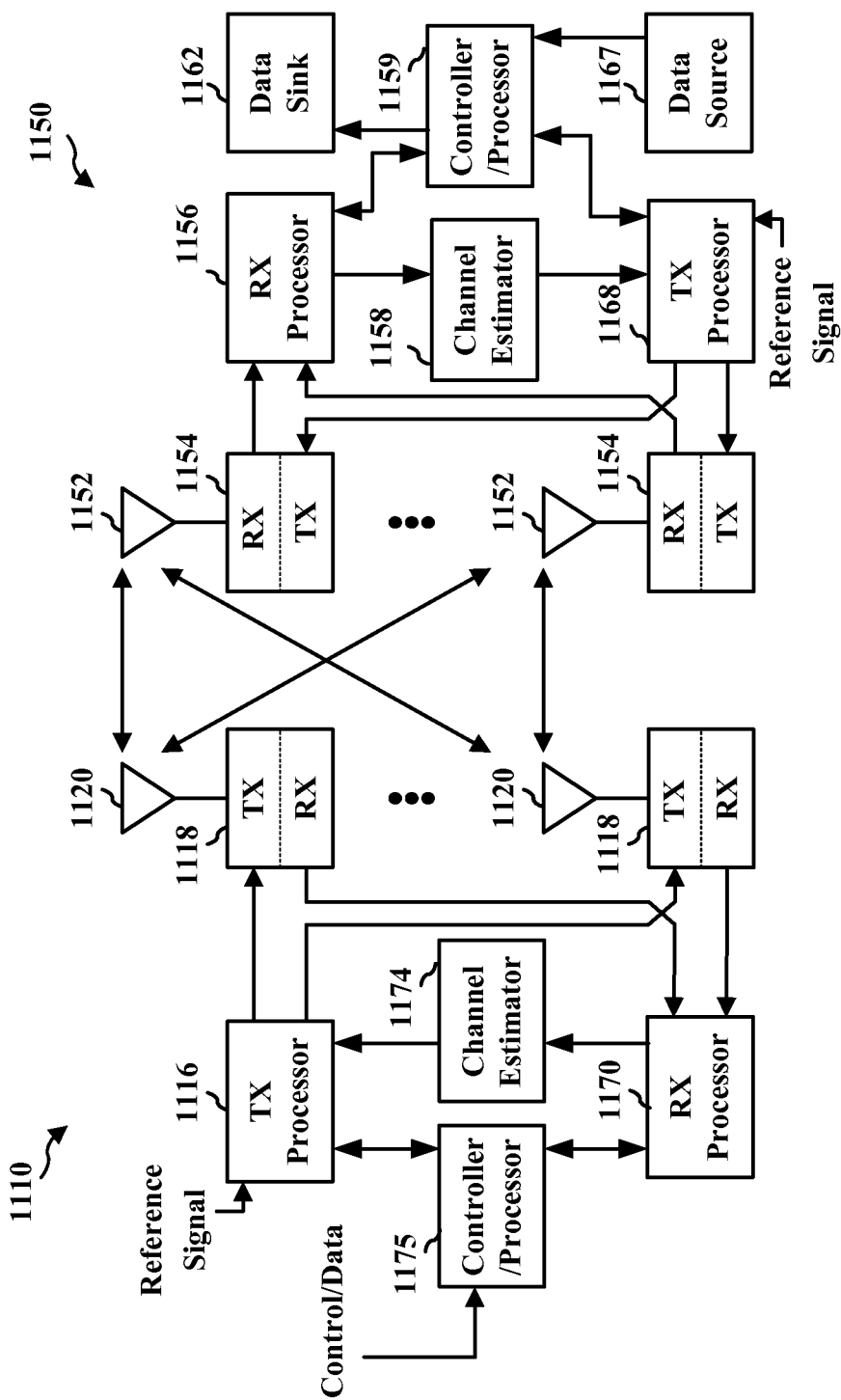
FIG. 11 is a diagram illustrating an example of an evolved Node B and user equipment in an access network.

FIG. 11 is a block diagram of an eNB 1110 in communication with a UE 1150 in an access network. In the DL, upper layer packets from the core network are provided to a controller/processor 1175. The controller/processor 1175 implements the functionality of the L2 layer described earlier in connection with FIG. 10. In the DL, the controller/processor 1175 provides header compression, ciphering, packet segmentation and reordering, multiplexing between logical and transport channels, and radio resource allocations to the UE 1150 based on various priority metrics. The controller/processor 1175 is also responsible for HARQ operations, retransmission of lost packets, and signaling to the UE 1150.

The TX processor 1116 implements various signal processing functions for the L1 layer (i.e., physical layer). The signal processing functions includes coding and interleaving to facilitate forward error correction (FEC) at the UE 1150 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1174 may be used to determine the coding and modulation scheme, as well as for spatial processing. The channel estimate may be derived from a reference signal and/or channel condition feedback transmitted by the UE 1150. Each spatial stream is then provided to a different antenna 1120 via a separate transmitter 1118TX. Each transmitter 1118TX modulates an RF carrier with a respective spatial stream for transmission.

At the UE 1150, each receiver 1154RX receives a signal through its respective antenna 1152. Each receiver 1154RX recovers information modulated onto an RF carrier and provides the information to the receiver (RX) processor 1156.

The RX processor 1156 implements various signal processing functions of the L1 layer. The RX processor 1156 performs spatial processing on the information to recover any spatial streams destined for the UE 1150. If multiple spatial streams are destined for the UE 1150, they may be combined by the RX processor 1156 into a single OFDM symbol stream. The RX processor 1156 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1110. These soft decisions may be based on channel estimates computed by the channel estimator 1158. The soft decisions are then decoded and deinterleaved to recover the data and control signals that were originally transmitted by the eNB 1110 on the physical channel. The data and control signals are then provided to the controller/processor 1159.

The controller/processor 1159 implements the L2 layer described earlier in connection with FIG. 10. In the UL, the control/processor 1159 provides demultiplexing between transport and logical channels, packet reassembly, deciphering, header decompression, control signal processing to recover upper layer packets from the core network. The upper layer packets are then provided to a data sink 1162, which represents all the protocol layers above the L2 layer. Various control signals may also be provided to the data sink 1162 for L3 processing. The controller/processor 1159 is also responsible for error detection using an acknowledgement (ACK) and/or negative acknowledgement (NACK) protocol to support HARQ operations.

In the UL, a data source 1167 is used to provide upper layer packets to the controller/processor 1159. The data source 1167 represents all protocol layers above the L2 layer (L2). Similar to the functionality described in connection with the DL transmission by the eNB 1110, the controller/processor 1159 implements the L2 layer for the user plane and the control plane by providing header compression, ciphering, packet segmentation and reordering, and multiplexing between logical and transport channels based on radio resource allocations by the eNB 1110. The controller/processor 1159 is also responsible for HARQ operations, retransmission of lost packets, and signaling to the eNB 1110.

Channel estimates derived by a channel estimator 1158 from a reference signal or feedback transmitted by the eNB 1110 may be used by the TX processor 1168 to select the appropriate coding and modulation schemes, and to facilitate spatial processing. The spatial streams generated by the TX processor 1168 are provided to different antenna 1152 via separate transmitters 1154TX. Each transmitter 1154TX modulates an RF carrier with a respective spatial stream for transmission.

The UL transmission is processed at the eNB 1110 in a manner similar to that described in connection with the receiver function at the UE 1150. Each receiver 1118RX receives a signal through its respective antenna 1120. Each receiver 1118RX recovers information modulated onto an RF carrier and provides the information to a RX processor 1170. The RX processor 1170 implements the L1 layer.

The controller/processor 1159 implements the L2 layer described earlier in connection with FIG. 10. In the UL, the control/processor 1159 provides demultiplexing between transport and logical channels, packet reassembly, deciphering, header decompression, control signal processing to recover upper layer packets from the UE 1150. Upper layer packets from the controller/processor 1175 may be provided to the core network. The controller/processor 1159 is also responsible for error detection using an ACK and/or NACK protocol to support HARQ operations.

The processing system 114 described in relation to FIG. 1 may include the eNB 1110. In particular, the processing system 114 may include the TX processor 1116, the RX processor 1170, and the controller/processor 1175. Further, the processing system 114 described in relation to FIG. 1 may include the UE 1150. In particular, the processing system 114 may include the TX processor 1168, the RX processor 1156, and the controller/processor 1159.

Figure 12:
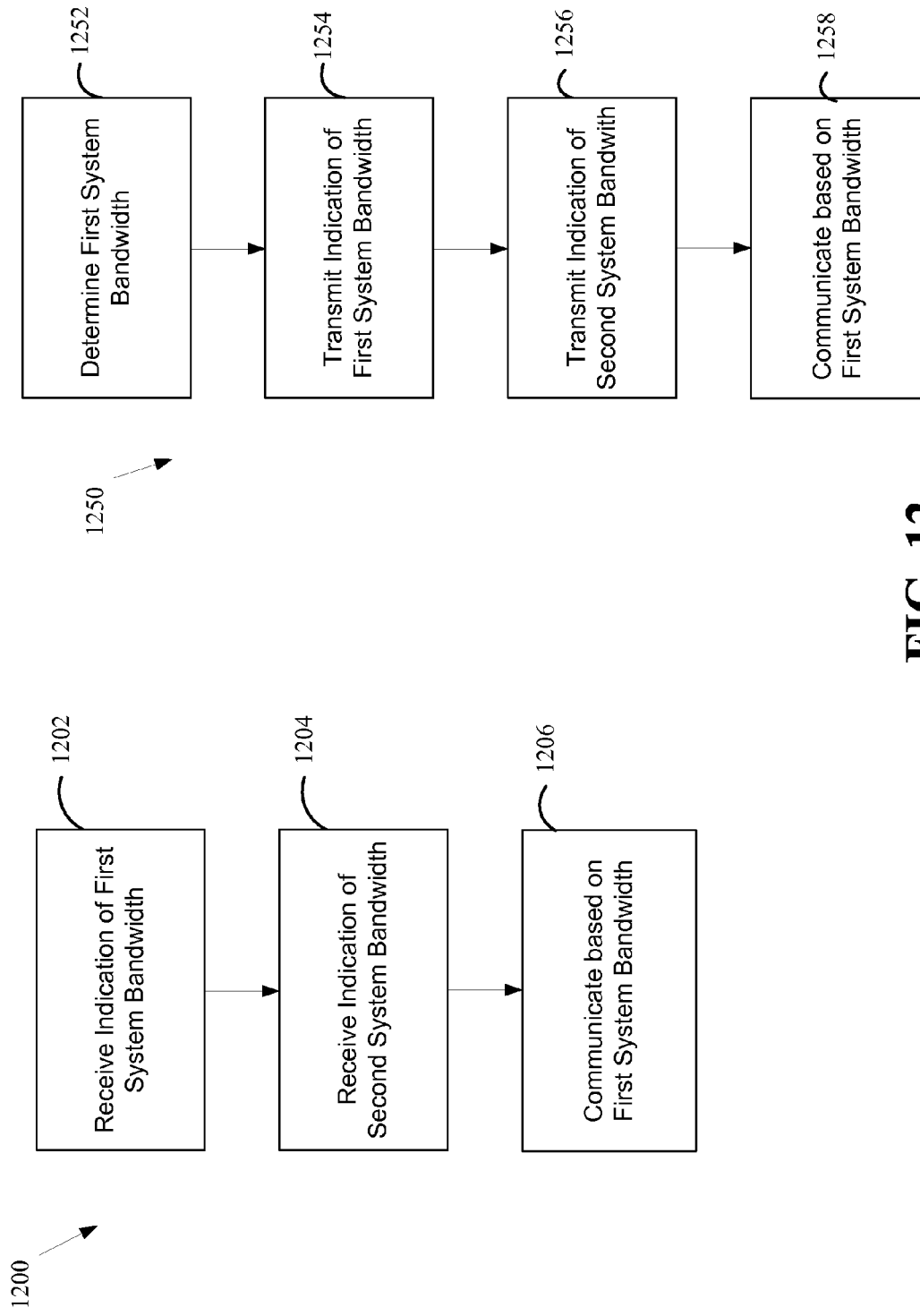
FIG. 12 is a flow chart illustrating exemplary processes in accordance with various aspects of the disclosure.

FIG. 12 includes two flow charts 1200 and 1250 that illustrate respective methods of wireless communication in accordance with certain aspects of the disclosure. In the first flow chart 1200, in block 1202, a UE (e.g., UE 1150, see FIG. 11) may receive an indication of a first system bandwidth from a corresponding eNB (e.g., eNB 1110, see FIG. 11). Here, the indication may be an explicit instruction such as a UE-specific unicast message, e.g., utilizing layer 3 RRC signaling; the indication may be a broadcast message directed to a number of UEs as a point-to-multipoint message; or the indication may be implicitly derived based at least in part on a characteristic of a UE-specific RNTI. In block 1204, the UE may receive an indication of a second system bandwidth from the corresponding eNB. Here, the indication of the second system bandwidth may be provided in a similar fashion as the first indication, to indicate the extent of the extended bandwidth. In block 1206, the UE may communicate with the corresponding eNB based on the first system bandwidth, e.g., the portion of the second bandwidth allocated to the UE.

In the second flow chart 1250, in block 1252, an eNB (e.g., eNB 1110, see FIG. 11) determines a first system bandwidth, including a portion of a second system bandwidth (e.g., an extended bandwidth). In block 1254, the eNB transmits an indication of the first system bandwidth to a corresponding UE. As discussed immediately above, this indication may be UE-specific signaling, may be a broadcast message, or may be implicitly included in an RNTI assignment, in accordance with various aspects of the disclosure. In block 1256, the eNB may transmit an indication of the second system bandwidth in accordance with various aspects of the disclosure. In block 1258, the eNB communicates with the corresponding UE based on the first system bandwidth, e.g., the portion of the second bandwidth allocated to the UE.

Referring to FIG. 1 and FIG. 11, in one configuration, the apparatus 100 (e.g., the eNB 1110) includes means for determining a first system bandwidth including a portion of resource blocks associated with a second system bandwidth, the second system bandwidth including an extension portion and a non-extension portion, means for transmitting an indication of the first system bandwidth, and means for communicating with a user equipment based on the first system bandwidth. Here, the aforementioned means may be the processing system 114 configured to perform the functions recited by the aforementioned means. As described supra, the processing system 114 may include the TX Processor 1116, the RX Processor 1170, and the controller/processor 1175. As such, in one configuration, the aforementioned means may be the TX Processor 1116, the RX Processor 1170, and the controller/processor 1175 configured to perform the functions recited by the aforementioned means.

In one configuration, the apparatus 100 (e.g., the UE 1150) for wireless communication includes means for receiving from a base station an indication of a first system bandwidth, the first system bandwidth including a portion of resource blocks associated with a second system bandwidth configured by the base station, the second system bandwidth including a non-extension portion and an extension portion, and means for communicating with the base station based on the first system bandwidth. Here, the aforementioned means may be the processing system 114 configured to perform the functions recited by the aforementioned means. As described supra, the processing system 114 may include the TX Processor 1168, the RX Processor 1156, and/or the controller/processor 1159. As such, in one configuration, the aforementioned means may be the TX Processor 1168, the RX Processor 1156, and the controller/processor 1159 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving from a base station an indication of a bandwidth to be used for communication with the base station, the bandwidth including a first system bandwidth and a second system bandwidth configured by the base station, the first system bandwidth comprising a subset of resource blocks associated with the second system bandwidth, the second system bandwidth comprising a non-extension portion and an extension portion, the extension portion comprising one or more resource blocks not capable of use by a non-empty subset of terminals served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth; and communicating with the base station based on the first system bandwidth, the second system bandwidth, or both.

2. The method of claim 1, wherein the first system bandwidth comprises resource blocks associated with the non-extension portion, and wherein the non-extension portion is adapted to be compatible with LTE release 8.

3. The method of claim 1, wherein the extension portion of the second system bandwidth comprises one or more resource blocks associated with at least one guard band of the non-extension portion.

4. The method of claim 1, wherein the extension portion is not compatible with an LTE standard of release 8 or earlier.

5. The method of claim 1, further comprising receiving an indication of the second system bandwidth.

6. The method of claim 1, wherein the indication of the first system bandwidth comprises one of a user equipment-specific uncast message or a broadcast message.

7. The method of claim 1, wherein the extension portion is located at respective edges of the non-extension portion.

8. The method of claim 7, wherein the extension portion is configured to be substantially symmetrical about the non-extension portion.

9. The method of claim 8, wherein the extension portion comprises a first extension portion associated with resource blocks at an upper edge of the non-extension portion and a second extension portion associated with resource blocks at a lower edge of the non-extension portion, and wherein at least one of the first extension portion or the second extension portion comprises at least two subsets of resource blocks.

10. The method of claim 9, wherein the resource blocks associated with the extension portion are divided among the first extension portion and the second extension portion such that the resource blocks associated with the extension portion are substantially symmetrical about the non-extension portion.

11. The method of claim 1, wherein the first system bandwidth comprises a subset of resource blocks associated with the non-extension portion of the second system bandwidth and resource blocks not associated with the second system bandwidth.

12. The method of claim 11, wherein the total number of resource blocks in the first system bandwidth does not exceed 110 resource blocks.

13. The method of claim 1, further comprising:
monitoring fewer than all of the resource blocks of the extension portion of the second system bandwidth, in accordance with the indicated bandwidth, wherein a subset of resource blocks to be monitored is indicated by a terminal-specific parameter.

14. The method of claim 13, wherein the terminal-specific parameter comprises a characteristic of a terminal-specific radio network temporary identifier.

15. The method of claim 14, wherein the characteristic of the terminal-specific radio network temporary identifier is whether the terminal-specific radio network temporary identifier is an odd number or an even number.

16. The method of claim 1, wherein the indicated bandwidth changes with time.

17. The method of claim 1, further comprising, in a terminal capable of using the extension portion, receiving scheduling information relating at least to use of the second system bandwidth in one or more resource blocks contained in the subset of resource blocks in the first system bandwidth that are associated with the second system bandwidth.

18. A method of wireless communication, comprising:
determining a bandwidth for communication including a first system bandwidth and a second system bandwidth, the first system bandwidth comprising a subset of resource blocks associated with the second system bandwidth, the second system bandwidth comprising an extension portion and a non-extension portion, the extension portion comprising one or more resource blocks not capable of use by a non-empty subset of user equipment served by the base station, wherein the non-extension portion of the second system bandwidth is accessible to the non-empty subset of user equipment served by the base station, and wherein the first system bandwidth comprises a total number of resource blocks that is less than or equal to a maximum number of resource blocks associated with the second system bandwidth;

transmitting an indication of the first system bandwidth; and communicating with at least one of the user equipment based on the first system bandwidth, the second system bandwidth, or both.

19. The method of claim 18, wherein the first system bandwidth comprises resource blocks associated with the non-extension portion, and wherein the non-extension portion is adapted to be compatible with LTE release 8.

20. The method of claim 18, wherein the extension portion of the second system bandwidth comprises one or more resource blocks associated with at least one guard band of the non-extension portion.

21. The method of claim 18, wherein the extension portion is not compatible with an LTE standard of release 8 or earlier.

22. The method of claim 18, further comprising providing an indication of the second system bandwidth.

23. The method of claim 22, wherein transmitting the indication of the first system bandwidth comprises providing a user equipment-specific radio network temporary identifier such that the indication of the first system bandwidth is determined based at least in part on a characteristic of the user equipment-specific radio network temporary identifier.

24. The method of claim 23, wherein the characteristic of the user equipment-specific radio network temporary identifier is whether the user equipment-specific radio network temporary identifier comprises an odd number or an even number.

25. The method of claim 18, wherein the transmitting of the indication of the first system bandwidth comprises transmitting a message comprising one of a user equipment-specific uncast message or a broadcast message.

26. The method of claim 18, wherein the extension portion is located at respective edges of the non-extension portion.

27. The method of claim 26, wherein the extension portion is configured to be substantially symmetrical about the non-extension portion.

28. The method of claim 27, wherein the extension portion comprises a first extension portion associated with resource blocks at an upper edge of the non-extension portion and a second extension portion associated with resource blocks at a lower edge of the non-extension portion, and
wherein at least one of the first extension portion or the second extension portion comprises at least two subsets of resource blocks.

29. The method of claim 28, wherein the resource blocks associated with the extension portion are divided among the first extension portion and the second extension portion such that the resource blocks associated with the extension portion are substantially symmetrical about the non-extension portion.

30. The method of claim 18, wherein the first system bandwidth comprises a subset of resource blocks associated with the non-extension portion of the second system bandwidth and resource blocks not associated with the second system bandwidth.

31. The method of claim 30, wherein the total number of resource blocks in the first system bandwidth does not exceed 110 resource blocks.

32. The method of claim 18, wherein the determined bandwidth changes with time.

33. The method of claim 18, further comprising transmitting, to a user equipment capable of using the extension portion of the second system bandwidth, scheduling information relating at least to use of the second system bandwidth in one or more resource blocks contained in the subset of resource blocks in the first system bandwidth that are associated with the second system bandwidth.

34. An apparatus for wireless communication, comprising:
means for receiving from a base station an indication of a bandwidth to be used for communication with the base station, the bandwidth including a first system bandwidth and a second system bandwidth configured by the base station, the first system bandwidth comprising a subset of resource blocks associated with the second system bandwidth, the second system bandwidth comprising a non-extension portion and an extension portion, the extension portion comprising one or more resource blocks not capable of use by a non-empty subset of terminals served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth; and
means for communicating with the base station based on the first system bandwidth, the second system bandwidth, or both.

35. The apparatus of claim 34, wherein the first system bandwidth comprises resource blocks associated with the non-extension portion, and wherein the non-extension portion is adapted to be compatible with LTE release 8.

36. The apparatus of claim 34, wherein the extension portion of the second system bandwidth comprises one or more resource blocks associated with at least one guard band of the non-extension portion.

37. The apparatus of claim 34, wherein the extension portion is not compatible with an LTE standard of release 8 or earlier.

38. The apparatus of claim 34, further comprising means for receiving an indication of the second system bandwidth.

39. The apparatus of claim 34, wherein the indication of the first system bandwidth comprises one of a user equipment-specific unicast message or a broadcast message.

40. The apparatus of claim 34, wherein the extension portion is located at respective edges of the non-extension portion.

41. The apparatus of claim 40, wherein the extension portion is configured to be substantially symmetrical about the non-extension portion.

42. The apparatus of claim 41, wherein the extension portion comprises a first extension portion associated with resource blocks at an upper edge of the non-extension portion and a second extension portion associated with resource blocks at a lower edge of the non-extension portion, and
wherein at least one of the first extension portion or the second extension portion comprises at least two subsets of resource blocks.

43. The apparatus of claim 42, wherein the resource blocks associated with the extension portion are divided among the first extension portion and the second extension portion such that the resource blocks associated with the extension portion are substantially symmetrical about the non-extension portion.

44. The apparatus of claim 34, wherein the first system bandwidth comprises a subset of resource blocks associated with the non-extension portion of the second system bandwidth and resource blocks not associated with the second system bandwidth.

45. The apparatus of claim 44, wherein the total number of resource blocks in the first system bandwidth does not exceed 110 resource blocks.

46. The apparatus of claim 34, further comprising:
means for monitoring fewer than all of the resource blocks of the extension portion of the second system bandwidth, in accordance with the indicated bandwidth, wherein a subset of resource blocks to be monitored is indicated by a terminal-specific parameter.

47. The apparatus of claim 46, wherein the terminal-specific parameter comprises a characteristic of a terminal-specific radio network temporary identifier.

48. The apparatus of claim 47, wherein the characteristic of the terminal-specific radio network temporary identifier is whether the terminal-specific radio network temporary identifier is an odd number or an even number.

49. The apparatus of claim 34, wherein the indicated bandwidth changes with time.

50. The apparatus of claim 34, wherein the apparatus is capable of using the extension portion, the apparatus further comprising means for receiving scheduling information relating at least to use of the second system bandwidth in one or more resource blocks contained in the subset of resource blocks in the first system bandwidth that are associated with the second system bandwidth.

51. An apparatus for wireless communication, comprising:
means for determining a bandwidth for communication, the bandwidth for communication including a first system bandwidth and a second system bandwidth, the first system bandwidth comprising a subset of resource blocks associated with the second system bandwidth, the second system bandwidth comprising an extension portion and a non-extension portion, the extension portion comprising one or more resource blocks not capable of use by a non-empty subset of user equipment served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth;

means for transmitting an indication of the first system bandwidth; and means for communicating with at least one of the user equipment based on the first system bandwidth, the second system bandwidth, or both.

52. A computer program product, comprising:

a non-transitory computer-readable medium comprising:

instructions for causing a computer to receive from a base station an indication of a bandwidth to be used for communicating with the base station, the bandwidth including a first system bandwidth and a second system bandwidth configured by the base station, the first system bandwidth comprising a subset of resource blocks associated with the second system bandwidth, the second system bandwidth comprising a non-extension portion and an extension portion, the extension portion comprising one or more resource blocks not capable of use by a non-empty subset of terminals served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth; and instructions for causing a computer to communicate with the base station based on the first system bandwidth, the second system bandwidth, or both.

53. The computer program product of claim 52, wherein the first system bandwidth comprises resource blocks associated with the non-extension portion, and wherein the non-extension portion is adapted to be compatible with LTE release 8.

54. The computer program product of claim 52, wherein the extension portion of the second system bandwidth comprises one or more resource blocks associated with at least one guard band of the non-extension portion.

55. The computer program product of claim 52, wherein the extension portion is not compatible with an LTE standard of release 8 or earlier.

56. The computer program product of claim 52, wherein the computer-readable medium further comprises instructions for causing a computer to receive an indication of the second system bandwidth.

57. The computer program product of claim 52, wherein the indication of the first system bandwidth comprises one of a user equipment-specific unicast message or a broadcast message.

58. The computer program product of claim 52, wherein the extension portion is located at respective edges of the non-extension portion.

59. The computer program product of claim 58, wherein the extension portion is configured to be substantially symmetrical about the non-extension portion.

60. The computer program product of claim 59, wherein the extension portion comprises a first extension portion associated with resource blocks at an upper edge of the non-extension portion and a second extension portion associated with resource blocks at a lower edge of the non-extension portion, and wherein at least one of the first extension portion or the second extension portion comprises at least two subsets of resource blocks.

61. The computer program product of claim 60, wherein the resource blocks associated with the extension portion are divided among the first extension portion and the second extension portion such that the resource blocks associated with the extension portion are substantially symmetrical about the non-extension portion.

62. The computer program product of claim 52, wherein the first system bandwidth comprises a subset of resource blocks associated with the non-extension portion of the second system bandwidth and resource blocks not associated with the second system bandwidth.

63. The computer program product of claim 62, wherein the total number of resource blocks in the first system bandwidth does not exceed 110 resource blocks.

64. The computer program product of claim 52, the computer-readable medium further comprising:

instructions for causing a computer to monitor fewer than all of the resource blocks of the extension portion of the second system bandwidth, in accordance with the indicated bandwidth, wherein a subset of resource blocks to be monitored is indicated by a terminal-specific parameter.

65. The computer program product of claim 64, wherein the terminal-specific parameter comprises a characteristic of a terminal-specific radio network temporary identifier.

66. The computer program product of claim 65, wherein the characteristic of the terminal-specific radio network temporary identifier is whether the terminal-specific radio network temporary identifier is an odd number or an even number.

67. The computer program product of claim 52, wherein the indicated bandwidth changes with time.

68. The computer program product of claim 52, the computer-readable medium further comprising:

instructions for causing a computer to receive scheduling information relating at least to use of the second system bandwidth in one or more resource blocks contained in the subset of resource blocks in the first system bandwidth that are associated with the second system bandwidth.

69. A computer program product, comprising:

a non-transitory computer-readable medium comprising:

instructions for causing a computer to determine a bandwidth for communication, the bandwidth for communication including a first system bandwidth and a second system bandwidth, the first system bandwidth comprising a subset of resource blocks associated with the second system bandwidth, the second system bandwidth comprising an extension portion and a non-extension portion, the extension portion comprising one or more resource blocks not capable of use by a non-empty subset of user equipment served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth;

instructions for causing a computer to transmit an indication of the first system bandwidth; and instructions for causing a computer to communicate with at least one of the user equipment based on the first system bandwidth, the second system bandwidth, or both.

70. An apparatus for wireless communication, comprising:
a processing system; and
a memory coupled to the processing system,
wherein the processing system is configured to:
receive from a base station an indication of a first system bandwidth and a second system bandwidth configured by the base station, the first system bandwidth comprising a subset of resource blocks associated with the second system bandwidth, the second system bandwidth comprising a non-extension portion and an extension portion, the extension portion comprising one or more resource blocks not capable of use by a non-empty subset of terminals served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth; and
communicate with the base station based on the first system bandwidth, the second system bandwidth, or both.

71. The apparatus of claim 70, wherein the first system bandwidth comprises resource blocks associated with the non-extension portion, and wherein the non-extension portion is adapted to be compatible with LTE release 8.

72. The apparatus of claim 70, wherein the extension portion of the second system bandwidth comprises one or more resource blocks associated with at least one guard band of the non-extension portion.

73. The apparatus of claim 70, wherein the extension portion is compatible with an LTE standard of release 8 or earlier.

74. The apparatus of claim 70, further wherein the processing system is further configured to receive an indication of the second system bandwidth.

75. The apparatus of claim 70, wherein the indication of the first system bandwidth comprises one of a user equipment-specific unicast message or a broadcast message.

76. The apparatus of claim 70, wherein the extension portion is located at respective edges of the non-extension portion.

77. The apparatus of claim 76, wherein the extension portion is configured to be substantially symmetrical about the non-extension portion.

78. The apparatus of claim 77, wherein the extension portion comprises a first extension portion associated with resource blocks at an upper edge of the non-extension portion and a second extension portion associated with resource blocks at a lower edge of the non-extension portion, and
wherein at least one of the first extension portion or the second extension portion comprises at least two subsets of resource blocks.

79. The apparatus of claim 78, wherein the resource blocks associated with the extension portion are divided among the first extension portion and the second extension portion such that the resource blocks associated with the extension portion are substantially symmetrical about the non-extension portion.

80. The apparatus of claim 70, wherein the first system bandwidth comprises a subset of resource blocks associated with the non-extension portion of the second system bandwidth and resource blocks not associated with the second system bandwidth.

81. The apparatus of claim 80, wherein the total number of resource blocks in the first system bandwidth does not exceed 110 resource blocks.

82. The apparatus of claim 70, wherein the processing system is further configured to monitor fewer than all of the resource blocks of the extension portion of the second system bandwidth, in accordance with the indicated bandwidth, wherein a subset of resource blocks to be monitored is indicated by a terminal-specific parameter.

83. The apparatus of claim 82, wherein the terminal-specific parameter comprises a characteristic of a terminal-specific radio network temporary identifier.

84. The apparatus of claim 83, wherein the characteristic of the terminal-specific radio network temporary identifier is whether the terminal-specific radio network temporary identifier is an odd number or an even number.

85. The apparatus of claim 70, wherein the indicated bandwidth changes with time.

86. The apparatus of claim 70, wherein the apparatus is capable of using the extension portion, and wherein the processing system is further configured to receive scheduling information relating at least to use of the second system bandwidth in one or more resource blocks contained in the subset of resource blocks in the first system bandwidth that are associated with the second system bandwidth.

87. An apparatus for wireless communication, comprising:
a processing system; and
a memory coupled to the processing system,
wherein the processing system is configured to:
determine a first system bandwidth and a second system bandwidth, the first system bandwidth comprising a subset of resource blocks associated with the second system bandwidth, the second system bandwidth comprising an extension portion and a non-extension portion, the extension portion comprising one or more resource blocks not capable of use by a non-empty subset of user equipment served by the base station, wherein the non-extension portion of the second system bandwidth is accessible to the non-empty subset of terminals served by the base station, and wherein the first system bandwidth comprises a total number of resource blocks that is less than or equal to a maximum number of resource blocks associated with the second system bandwidth;
transmit an indication of the first system bandwidth; and
communicate with at least one of the user equipment based on the first system bandwidth, the second system bandwidth, or both.

* * * * *